United States Patent
Whiting et al.

(10) Patent No.: US 10,187,222 B2
(45) Date of Patent: Jan. 22, 2019

(54) METHODS AND DEVICES FOR COMMUNICATING OVER A BUILDING MANAGEMENT SYSTEM NETWORK

(71) Applicant: Honeywell Technologies Sarl, Rolle (CH)

(72) Inventors: Graham Whiting, Worthing (GB); Xiaobo Zhang, Rolle (CH); Yongxi Zhou, Beijing (CN)

(73) Assignee: Honeywell Technologies Sarl, Rolle (CH)

( * ) Notice: Subject to any disclaimer, the term of this patent is extended or adjusted under 35 U.S.C. 154(b) by 103 days.

(21) Appl. No.: 14/933,903

(22) Filed: Nov. 5, 2015

(65) Prior Publication Data

US 2016/0134434 A1 May 12, 2016

(30) Foreign Application Priority Data

Nov. 6, 2014 (GB) .................................. 1419789.1

(51) Int. Cl.
*H04L 12/18* (2006.01)
*H04L 12/417* (2006.01)
*H04L 12/433* (2006.01)

(52) U.S. Cl.
CPC ........ *H04L 12/417* (2013.01); *H04L 12/1895* (2013.01); *H04L 12/433* (2013.01)

(58) Field of Classification Search
CPC ..................................................... H04L 12/417
USPC ......................................................... 370/338
See application file for complete search history.

(56) References Cited

U.S. PATENT DOCUMENTS

| | | | |
|---|---|---|---|
| 3,643,183 A | 2/1972 | Geffe | |
| 3,715,693 A | 2/1973 | Fletcher et al. | |
| 3,758,885 A | 9/1973 | Voorman et al. | |
| 4,264,874 A | 4/1981 | Young | |
| 4,529,947 A | 7/1985 | Biard et al. | |
| 4,538,147 A * | 8/1985 | Grow ................... | H04L 12/433 370/224 |

(Continued)

FOREIGN PATENT DOCUMENTS

| | | |
|---|---|---|
| CH | 673184 | 2/1990 |
| DE | 4344172 | 6/1995 |

(Continued)

OTHER PUBLICATIONS

Token Ring Protocol, various authors including Stephen D. Cote, Oct. 18, 2001.*

(Continued)

*Primary Examiner* — Peter G Solinsky
(74) *Attorney, Agent, or Firm* — Seager, Tufte & Wickhem LLP

(57) ABSTRACT

A method of communication between devices of a building management system (1) over a token ring network, comprising the steps of: a first device receiving (101) the token (2) for the token ring network; the first device, in response to receiving the token (2), broadcasting (105) a request message over the network; a second device, in response to receiving the request message over the network, sending a command message to a receiving device over the network; and the first device passing (107) the token (2) for the token ring network to a subsequent device on the network.

27 Claims, 3 Drawing Sheets

(56) References Cited

U.S. PATENT DOCUMENTS

| | | | | |
|---|---|---|---|---|
| 4,566,097 A | * | 1/1986 | Bederman | H04L 12/433 370/455 |
| 4,748,560 A | | 5/1988 | Katsoka | |
| 4,780,871 A | * | 10/1988 | Arakawa | H04L 12/417 370/450 |
| 4,812,785 A | | 3/1989 | Pauker | |
| 4,819,229 A | * | 4/1989 | Pritty | G06F 13/26 370/455 |
| 5,012,468 A | | 4/1991 | Siegel et al. | |
| 5,051,986 A | * | 9/1991 | Grow | H04L 12/433 370/455 |
| 5,140,586 A | * | 8/1992 | Kloper | H04L 12/417 370/216 |
| 5,181,202 A | * | 1/1993 | Walser | H04J 3/0688 370/452 |
| 5,228,027 A | * | 7/1993 | Yamaguchi | H04L 12/433 370/431 |
| 5,253,252 A | | 10/1993 | Tobol | |
| 5,274,637 A | * | 12/1993 | Sakamura | H04L 12/433 370/455 |
| 5,381,413 A | * | 1/1995 | Tobagi | H04L 47/10 370/232 |
| 5,392,003 A | | 2/1995 | Nag et al. | |
| 5,430,409 A | | 7/1995 | Buck et al. | |
| 5,451,898 A | | 9/1995 | Johnson | |
| 5,481,259 A | | 1/1996 | Bane | |
| 5,511,166 A | * | 4/1996 | Travaglio | H04L 12/433 709/250 |
| 5,546,301 A | | 8/1996 | Agrawal et al. | |
| 5,566,178 A | | 10/1996 | Butter et al. | |
| 5,596,580 A | * | 1/1997 | Walser | H04L 12/422 370/455 |
| 5,598,414 A | * | 1/1997 | Walser | H04L 12/422 370/455 |
| 5,642,071 A | | 6/1997 | Sevenhans et al. | |
| 5,726,603 A | | 3/1998 | Chawla et al. | |
| 5,767,664 A | | 6/1998 | Price | |
| 5,809,013 A | | 9/1998 | Kackman | |
| 5,847,623 A | | 12/1998 | Hadjichristos | |
| 5,963,650 A | | 10/1999 | Simionescu et al. | |
| 6,175,860 B1 | | 1/2001 | Gaucher | |
| 6,414,863 B1 | | 7/2002 | Bayer et al. | |
| 6,578,113 B2 | | 6/2003 | Krishnamurthy et al. | |
| 6,901,066 B1 | | 5/2005 | Helgeson | |
| 7,149,833 B2 | | 12/2006 | McLeod | |
| 7,460,930 B1 | | 12/2008 | Howell et al. | |
| 7,552,030 B2 | | 6/2009 | Guralnik et al. | |
| 7,650,425 B2 | | 1/2010 | Davis et al. | |
| 7,904,631 B2 | | 3/2011 | Pham et al. | |
| 7,986,701 B2 | | 7/2011 | Kore et al. | |
| 8,572,539 B2 | | 10/2013 | Cortadella et al. | |
| 2002/0027504 A1 | | 3/2002 | Davis et al. | |
| 2002/0059408 A1 | * | 5/2002 | Pattabhiraman | H04J 3/085 709/223 |
| 2002/0064163 A1 | * | 5/2002 | Fujiyama | H04L 12/40182 370/400 |
| 2002/0178250 A1 | * | 11/2002 | Haartsen | H04L 12/4015 709/223 |
| 2004/0047319 A1 | * | 3/2004 | Elg | H04W 74/02 370/338 |
| 2006/0274745 A1 | * | 12/2006 | Wang | H04W 88/16 370/389 |
| 2009/0312853 A1 | * | 12/2009 | Kore | G05B 19/4185 700/90 |
| 2010/0169269 A1 | * | 7/2010 | Chandrasekaran | G06F 17/30165 707/608 |
| 2011/0312299 A1 | * | 12/2011 | Patil | H04L 63/20 455/410 |
| 2014/0235269 A1 | * | 8/2014 | Ericsson | H05B 37/0272 455/456.1 |

FOREIGN PATENT DOCUMENTS

| | | |
|---|---|---|
| EP | 06070562 | 7/1994 |
| JP | 5916953 | 9/1984 |
| JP | 9162907 | 6/1997 |

OTHER PUBLICATIONS

Jia, Weijia; Cao, Jiannong; Cheung, To-Yat; A Multicast Protocol Based on a Single Logical Ring Using a Virtual Token and Logical Clocks, 1996.*

"Image-Rejection in Mixers," copyright AAA, 4 pages, 1996.

Abidi, "Direct-Conversion Radio Transceivers for Digital Communications," IEEE Journal of Solid-State Circuits, vol. 30, No. 12, 12 pages, Dec. 1995.

Alves, "Real-Time Communications Over Hybrid Wired/Wireless PROFIBUS-Based Networks," Doctoral Dissertation, 189 pages, Oct. 2002.

Chang et al., "A CMOS Channel-Select Filter for a Direct-Conversion Wireless Receiver," IEEE Journal of Solid-State Circuits, 26 pages, Apr. 1999.

European Search Report for Application No. GB1419789.1, dated May 7, 2015.

Crols et al., "CMOS Wireless Transceiver Design", Kluwer Academic Publishers, 8 pages, 1997.

Ferriera et al., "Hybrid Wired/Wireless PROFIBUS Networks Supported by Bridges/Routers," 4th IEEE International Workshop on Factory Communication Systems, pp. 193-202, Aug. 28-30, 2002.

Hong et al., "Experimental Evaluation of Bandwidth Allocation for the Master-Slave/Token-Passing Protocol," IET Communications, vol. 5, Issue 4, pp. 467-475, 2011.

Lee, "The Design of COMS Radio-Frequency Integrated Circuits," 10 pages, 1998.

Moulding et al., "Gyrator Video Filter IC with Automatic Tuning," IEEE Journal of Solid-State Circuits, vol. SC15, No. 6, pp. 963-968, Dec. 1980.

Park et al., "Performance Evaluation of BACnet MS/TP Protocol Using Experimental Model," Industrial Technology, IEEE, pp. 577-582, 2005.

Philips, "Advanced Pager Receiver UAA2082," Integrated Circuits, pp. 1-38, Jan. 16, 1996.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Reinisch et al., "Wireless Technologies in Home and Building Automation," IEEE, pp. 93-98, 2007.

Rofougaran et al., "A 1 GHz CMOS RF Front-End IC for a Direct-Conversion Wireless Receiver," IEEE Journal of Solid-State Circuits, vol. 31, 28 pages, Jul. 1996.

Rofougaran et al., "A 900 MHz CMOS RF Power Amplifier with Programmable Output Power", Proceedings VLSI Circuits Symposium, Honolulu, 23 pages, Jun. 1994.

Wilson et al., "A Single-Chip VHF and UHF Receiver for Radio Paging," IEEE Journal of Solid State Circuits, vol. 26, No. 12, pp. 1944-1950, Dec. 1991.

* cited by examiner

METHODS AND DEVICES FOR COMMUNICATING OVER A BUILDING MANAGEMENT SYSTEM NETWORK

This application claims priority to GB 1419789.1, filed Nov. 6, 2014.

FIELD OF THE INVENTION

The present invention concerns building management systems, that is a system comprising heating, ventilation and air conditioning (HVAC) devices, lighting, security, associated control devices and the like for managing the internal environment of a building. More particularly, but not exclusively, the invention concerns methods and devices for communicating over a building management system network.

BACKGROUND OF THE INVENTION

It is common for the devices of a building management system to communicate using a token ring network, such as a network using the BACnet™ protocol. In a token ring network, a token is passed in turn among the devices on the network, with a device only being allowed to transmit on the network when it is in possession of the token.

Traditionally, the speed of communication between devices in a building management system has not been of particular importance, and consequently networks such as BACnet™ have not been designed to ensure fast communication. However, modern building management systems may now include devices controlled by control devices, for which a user will expect an immediate response, requiring that the communication time between the devices is sufficiently small. For example, a user may be able to control a set of electric window blinds using a control panel, and in this case a significant delay between pushing a button on the control panel and the blinds taking the required action will cause annoyance to the user.

A medium-sized building management system may comprise 64 devices that can communicate via the network. If the average delay in passing the token between devices in the network is 4.5 ms, which is not unusually slow, this leads to a time taken for the token to complete a circuit of the devices of the network of 290 ms. In addition, a control device might take 50 ms to acquire an input signal in response to a user pressing a button on a control panel, and 75 ms to execute internal logic to produce a message to send over the network. A device receiving the message then may take 75 ms to execute internal logic and then take the required action. This results in a potential delay of the order of 400 ms, and more for building management systems with more devices, which is sufficiently long to cause annoyance to a user. Ideally a maximum potential delay would be 250 ms, giving a maximum time for communication between devices of 50 ms.

The present invention seeks to mitigate the above-mentioned problems. Alternatively and/or additionally, the present invention seeks to provide improved methods and devices for communicating over a building management system network.

SUMMARY OF THE INVENTION

In accordance with a first embodiment of the invention there is provided a method of communication between devices of a building management system over a token ring network, comprising the steps of:

a first device receiving the token for the token ring network;

the first device, in response to receiving the token, broadcasting a request message over the network;

a second device, in response to receiving the request message over the network, sending a command message to a receiving device over the network;

the first device passing the token for the token ring network to a subsequent device on the network.

In this way, a second device that has a message that it wishes to send is able to send it in response to the first device sending the request message, and does not need to wait until it receives the token for the token ring network. This allows time-sensitive messages to be sent with a sufficiently small delay to not cause annoyance to a user. As the token is passed around the devices on the network, each device can broadcast a request message so providing an opportunity for other devices to send a time-sensitive message.

Preferably, the first device waits a predetermined token passing period before passing the token to the subsequent device. This provides a period during which other device can respond to the request message. Preferably, the predetermined token passing period is between 20 ms and 30 ms. More preferably, the predetermined token passing period is 25 ms. However, it will be appreciated that any other appropriate predetermined token passing period could be used in accordance with the invention.

Preferably, the first device passes the token to the subsequent device in response to the second device sending the command message to the receiving device over the network. This avoids any unnecessary delay after a device has responded to the request device.

Preferably, the first device broadcasts the request message over the network only if a predetermined request message period has passed since a request message was last broadcast over the network. This prevents the network being overloaded due to request messages being sent too frequently. Preferably, the predetermined request message period is 40 ms to 60 ms. More preferably, the predetermined request message period is 50 ms.

Preferably, the first device transmits a message to another device over the network prior to broadcasting the request message over the network. This allows the first device to send its own message prior to allowing another device to send a message in response to the request message.

Preferably, the second device, in response to receiving the request message over the network, waits a predetermined command message period before sending the command message to the receiving device. In this case, advantageously the predetermined command message period is calculated using the MAC address of the device. This allows each device on the network to wait a unique predetermined command message period before sending a command message. The predetermined command message period may be 195 µs multiplied by the MAC address, for example. Alternatively any other device-specific value can be used to calculate a unique predetermined command message period. Alternatively, any other suitable period may be used, for example a randomly-chosen period. Advantageously, the second device after waiting the predetermined command message period checks if any other device is sending a message over the network, and in the case that another device is sending a message, does not send the command message to the receiving device. This helps prevent two devices sending a command message at the same time or sufficiently closely to cause a clash, in which case neither message may be successful. Advantageously, the messages contain a unique ID, which allows the receiving device to identify and filter out repeats of a message that has been received multiple times.

Advantageously, the second device in response to receiving the token sends the command message again to the receiving device. This provides a backup should the command message when originally sent fail, for example due to a clash of messages.

In accordance with a second embodiment of the invention there is provided a building management device arranged to communicate with other devices of a building management system over a token ring network, the device being arranged to:

receive the token for the token ring network;

in response to receiving the token, broadcast a request message over the network;

pass the token for the token ring network to a subsequent device on the network.

Preferably, the building management device is further arranged to wait a predetermined token passing period before passing the token to the subsequent device. Preferably, the predetermined token passing period is between 20 ms and 30 ms.

Preferably, the building management device is further arranged to pass the token to the subsequent device in response to another device sending a command message to a receiving device over the network.

Preferably, the building management device is further arranged to broadcast the request message over the network only if a predetermined request message period has passed since a request message was last broadcast over the network.

Preferably, the predetermined request message period is 40 ms to 60 ms. However, it will be appreciated that any other appropriate predetermined request message period could be used in accordance with the invention.

Preferably, the building management device is further arranged to transmit a message to another device over the network prior to broadcasting the request message over the network.

Preferably, the building management device is further arranged, in response to receiving a request message over the network, to send a command message to a receiving device over the network.

In accordance with a third embodiment of the invention there is provided a building management device arranged to communicate with other devices of a building management system over a token ring network, the device being arranged, in response to receiving a request message over the network, to send a command message to a receiving device over the network.

Preferably, the building management device is further arranged, in response to receiving the request message over the network, to wait a predetermined command message period before sending the command message to the receiving device. In this case, advantageously the predetermined command message period is calculated using the MAC address of the device. Advantageously, the building management device is further arranged, after waiting the predetermined command message period, to check if any other device is sending a message over the network, and in the case that another device is sending a message, to not send the command message to the receiving device.

Advantageously, the building management device is further arranged, in response to receiving the token, to send the command message again to the receiving device.

In accordance with a fourth embodiment of the invention there is provided a building management system comprising:

a token ring network;

at least one building management device as described above;

at least one building management device as described above.

In accordance with a fifth embodiment of the invention there is provided a computer program product arranged, when executed on a computing device, to perform any of the methods described above.

In accordance with a sixth embodiment of the invention there is provided a computer program product arranged, when executed on a computing device, to provide any of the building management devices described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
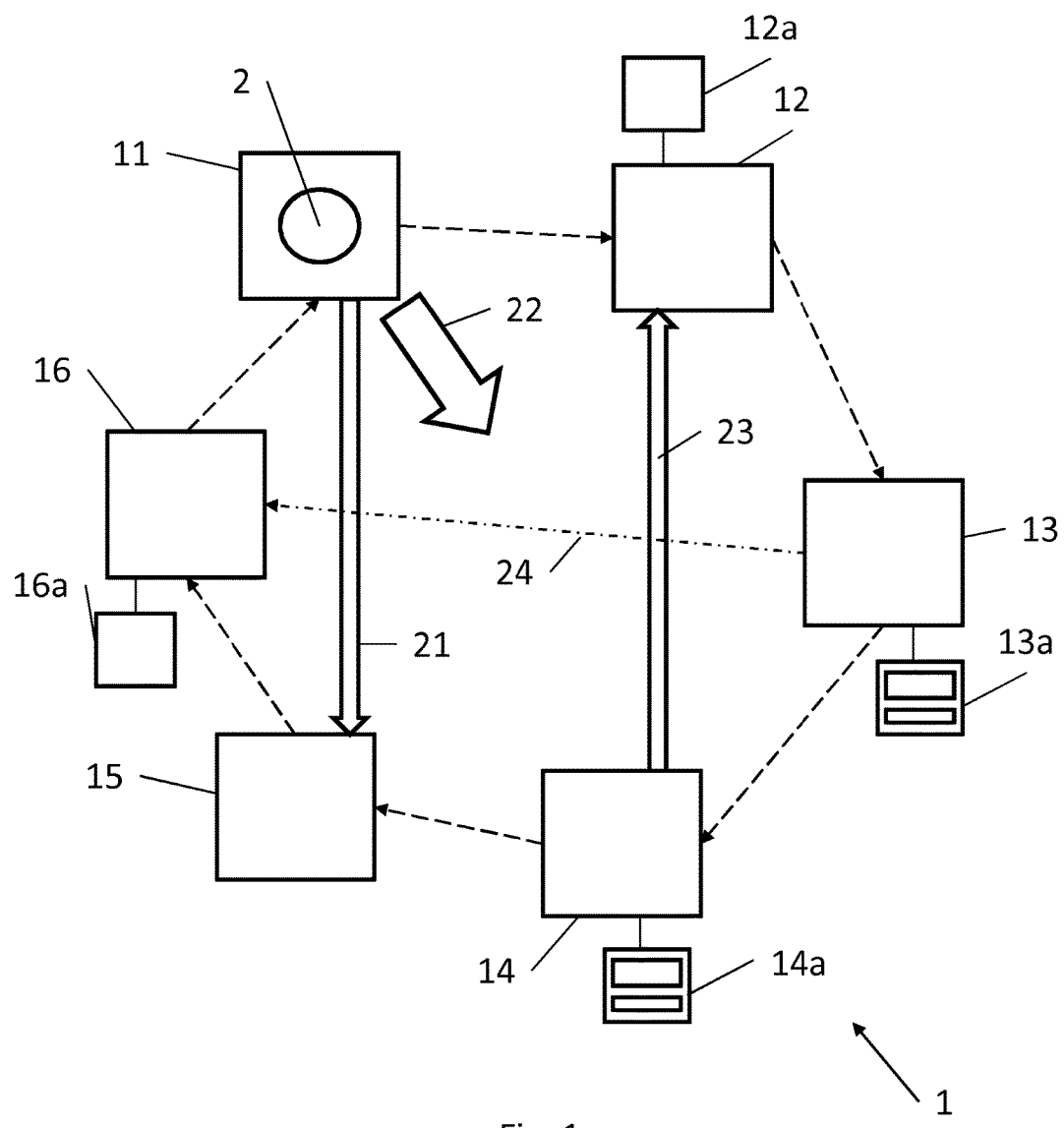
FIG. 1 shows a building management system in accordance with an embodiment of the invention.

A building management system in accordance with an embodiment of the invention is 15 shown in FIG. 1. The building management system 1 comprises building management devices 11 to 16, which are part of a token ring network, as indicated by the dashed arrows from building management device 11 to 12, 12 to 13, 13 to 14, 14 to 15, 15 to 16, and from 16 back to 11. The token 2 of the token ring network is possessed by the building management device 11.

Building management devices 13 and 14 are in communication with control panels 13a and 14a respectively, using which a user send commands to control the building management system, for example by pressing a button to instruct a set of electric window blinds to open. Building management devices 12 and 16 are in communication with environmental control devices 12a and 16a respectively, which in the present example are electric window blinds.

The operation of the building management devices of the building management system 1 is now described with reference to the flowcharts of FIGS. 2 and 3. In the present example, the building management device 11 wishes to send a non-time-sensitive message to the building management device 15. This may occur when, for example, a device wished to provide a periodic report of local environmental conditions (e.g. temperature) to a management system. The building management device 13 wishes to send a time-sensitive message to the building management device 16, for example to operate the electric window blinds in response to a user pressing a button on the control panel 13a. Similarly, the building management device 14 wishes to send a time-sensitive message to the building management device 12.

Figure 2:
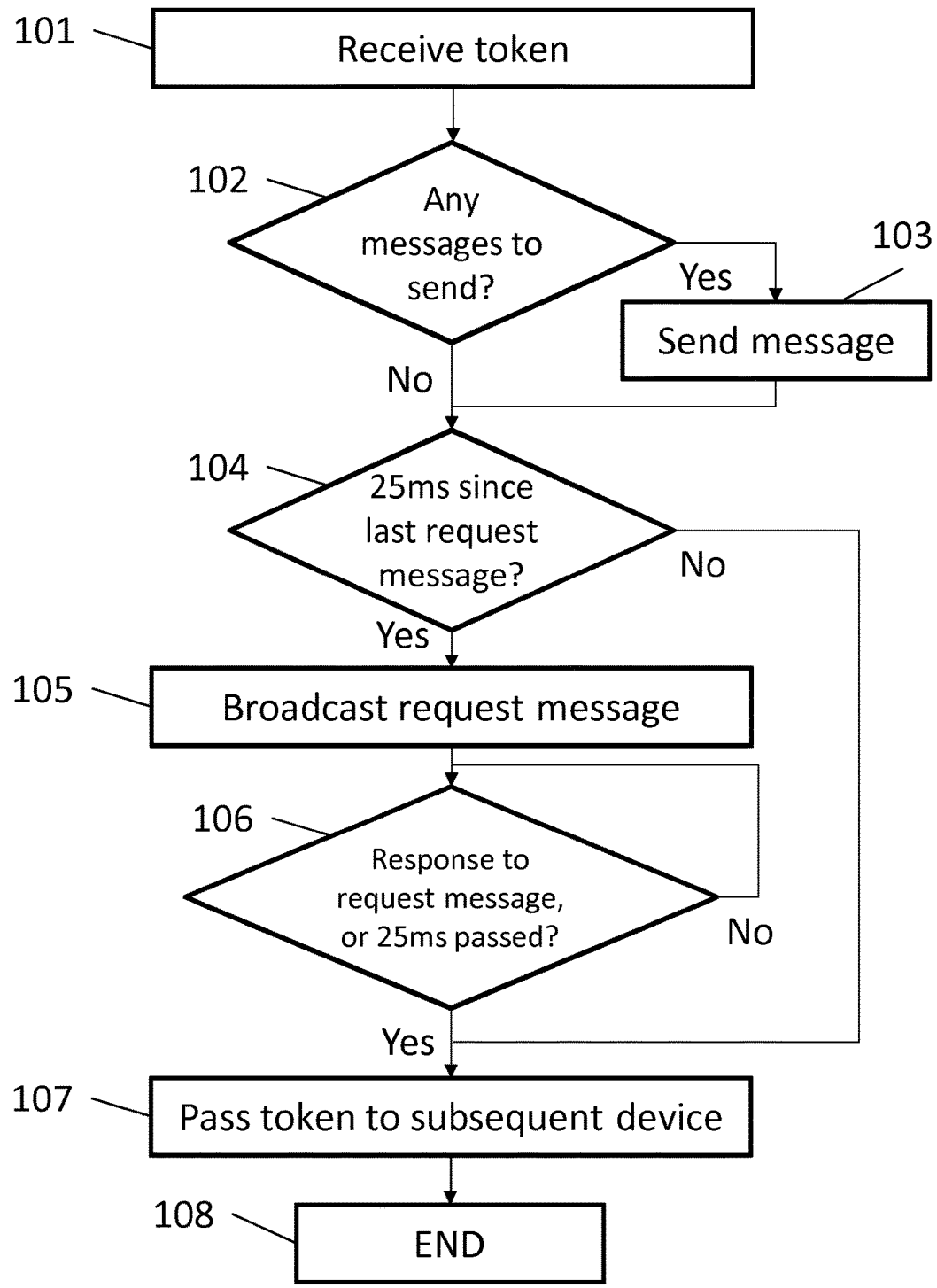
FIG. 2 is a flowchart showing the operation of a building management device of FIG. 1 on receipt of the token of the token ring network.

FIG. 2 describes the operation of a device of the building management system 1 on receipt of the token 2 of the token ring network. The operation of the building management device 11 in this situation is now described. First, the building management device 11 receives the token (step 101). The building management device 11 then determined whether it has any messages to send (step 102). As discussed above, in the present example the building management device 11 wishes to send a non-time-sensitive message to the building management device 15, and so it does so (step 103) as indicted by the thick arrow 21 in FIG. 1. As the message is non-time-sensitive, the building management device 11 is able to wait until receiving the token 2 before sending the message, without any delay causing annoyance to a user.

The building management device 11 then checks whether 25 ms has passed since the last request message was broadcast on the network (step 104). If it has not, it passes the token to the subsequent device in the network (step 107) and then its current operation has completed (step 108). By only sending a request message if 25 ms has passed, this helps prevent the network becoming overloaded with request messages and command messages sent in response.

Otherwise, the building management device 11 broadcasts a request message on the network (step 105), as indicated by the thick arrow 22 in FIG. 1. The building management device 11 then waits until 25 ms have passed or a response to the request message has been made by another device on the network (step 106). In the present example another device will respond to the request message, as described in more detail below.

In response to the command message in response to the request message being made, the building management device 11 passes the token to the subsequent device in the network (step 107), in the words building management device 12, and then its current operation has completed (step 108).

Figure 3:
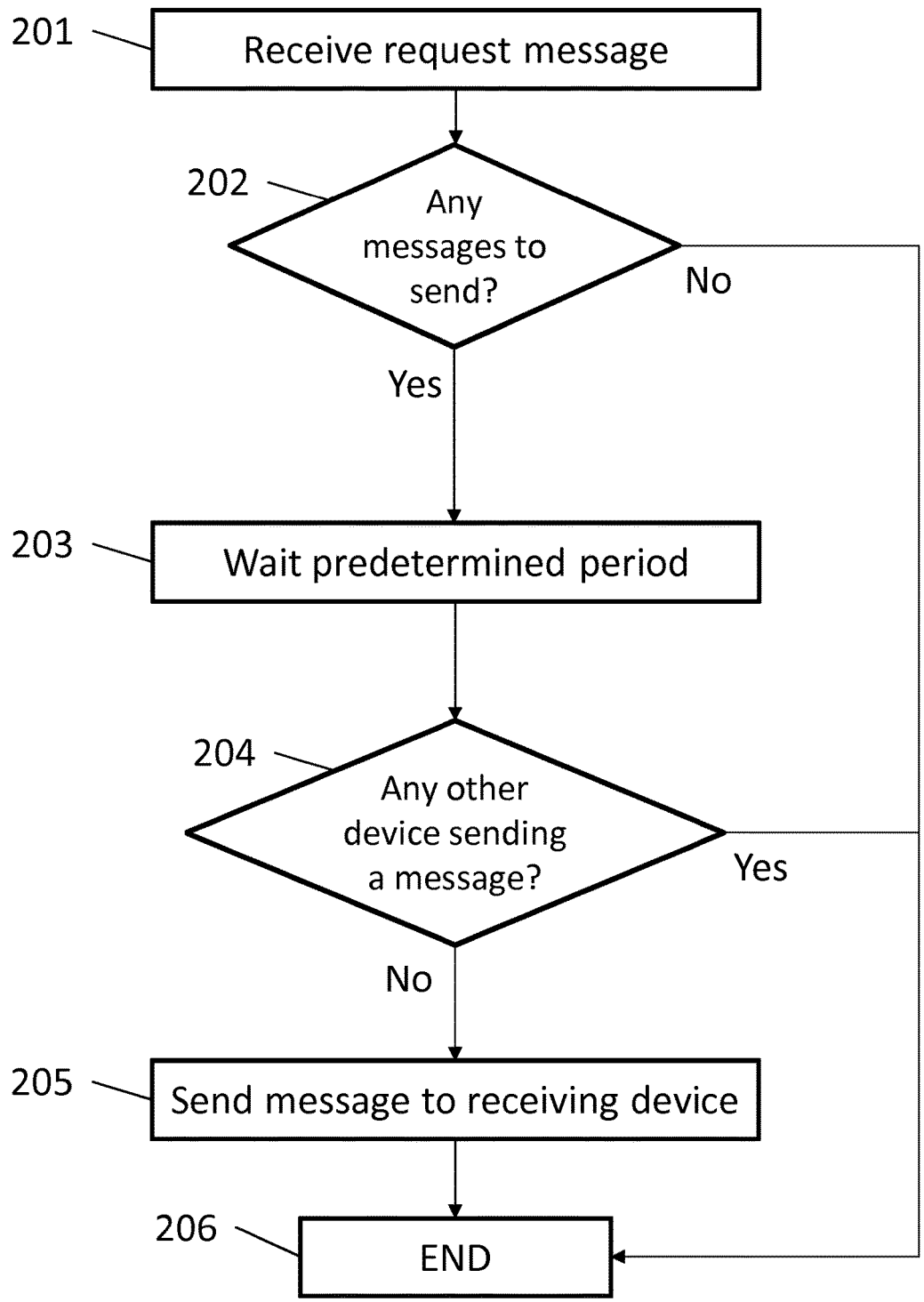
FIG. 3 is a flowchart showing the operation of a building management device of FIG. 1 in response to a request message broadcast by another device.

FIG. 3 describes the operation of a device of the building management system 1 in response to a request message being broadcast on the network. The operation of the building management device 14 in this situation, in particular in response to the building management device 11 broadcasting the request message as described above, is now described. First, the building management device 14 receives the request message (step 201). The building management device 14 then determined whether it has any messages to send (step 202). As discussed above, in the present example the building management device 14 wishes to send a time-sensitive message to the building management device 12. The building management device 14 then waits a pre-determined time period (step 203). The pre-determined time period is determined by multiplying its media access control (MAC) address (the address that uniquely identifies it on the network) with a time period of 195 µs. (It is noted that MAC addresses of devices on networks that use the BACnet protocol are 8 bits only.) In this way, different devices of the building management system 1 will usually wait different pre-determined time periods. In this example, the 8-bit MAC address for the building management device 14 is 20, and so the building management device 14 waits 3.9 ms.

After waiting the pre-determined time period, the building management device 14 checks whether any other devices have responded to the response message (step 204). In the present example, no other devices have responded. The building management device 14 then sends its message to the receiving device (step 205), the building management device 12, as indicated by the thick arrow 23 in FIG. 1. In this way, the building management device 14 is able to send its time-sensitive message to the building management device 12 without having to wait until it is passed the token 2 of the token ring network. The current operation of the building management device 14 has then completed (step 206).

The operation of the building management device 13 in response to the building management device 11 broadcasting the request message is now described. As with the building management device 14, first the building management device 13 receives the request message (step 201). The building management device 13 then determines that it wishes to send a time-sensitive message to the building management device 16 (step 202). The building management device 13 then waits a pre-determined time period (step 203). In this case, the 8-bit MAC address for the building management device 13 is 30, and so the pre-determined time period is 5.85 ms.

After waiting the pre-determined time period, the building management device 13 checks whether any other devices have responded to the response message (step 204). In this case, the building management device 14 has sent its time-sensitive message (as it waited only a 3.9 ms before attempting to send a message). Consequently, the building management device 13 does not send its message to the building management device 16 (as indicated by the dashed arrow 24 in FIG. 1), but instead its current operation has completed (step 206).

In this way, the building management device 13 does not send a message that clashes with the message of the building management device 14, which could cause neither message to be successful.

Once the token 2 has been passed to building management device 12, it will operate as described in FIG. 2. In particular, it will broadcast a request message. At this stage, assuming no other devices on the network respond to the request message before it attempts to do so, the building management device 14 can now send its time-sensitive message. (The building management device 14 has already now sent its time-sensitive message, and so will not send a message in response to the broadcast message unless it has a new message to send.) Assuming the building management device 13 is able to send its message, the delay caused by not sending its message in response to the previous request message is only the time it takes for the token 2 to be passed from building management device 11 to building management device 12, i.e. around 25 ms, so considerably less than the time it will take for the token 2 to be passed to building management device 13.

Once the token 2 has been passed to building management device 13, it will send its time-sensitive message to building management device 16, even if it has already done so in response to a request message. Similarly, building management device 14 will send its time-sensitive message to building management device 12 when it is passed the token 2. This ensures that a device is able to send its message even if it is never the first to send a message in response to a request message. It also provides a backup should a message sent in response to a request message fail, for example due to a clash of messages.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of communication between a plurality of devices of a building management system over a token ring network having a token which is passed around the devices sequentially in an order, the method comprising:
    a first device receiving the token for the token ring network;
    the first device, in response to receiving the token, broadcasting a request message concurrently to each of the plurality of devices over the token ring network, the request message allowing another device of the plurality of devices to send a time-sensitive command message over the token ring network;
    a second device, not necessarily sequentially next in the order, and in response to receiving the broadcasted request message over the token ring network, sending a time-sensitive command message to a receiving device without the use of the token over the token ring network, the time-sensitive command message being configured to command the receiving device to perform a commanded building management function;
    the first device passing the token for the token ring network to the subsequent device in the order of the devices on the token ring network.

2. A method as claimed in claim 1, wherein the first device waits a predetermined token passing period before passing the token to the subsequent device.

3. A method as claimed in claim 2, wherein the predetermined token passing period is between 20 ms and 30 ms.

4. A method as claimed in claim 1, wherein the first device passes the token to the subsequent device in response to the second device sending the time-sensitive command message to the receiving device over the token ring network.

5. A method as claimed in claim 1, wherein the first device broadcasts the request message over the token ring network only if a predetermined request message period has passed since a request message was last broadcast over the token ring network.

6. A method as claimed in claim 5, wherein the predetermined request message period is 40 ms to 60 ms.

7. A method as claimed in claim 1, wherein the first device having the token transmits a message to another device over the token ring network prior to broadcasting the request message over the token ring network.

8. A method as claimed in claim 1, wherein the second device, in response to receiving the broadcasted request message over the token ring network, waits a predetermined command message period before sending the time-sensitive command message to the receiving device.

9. A method as claimed in claim 8, wherein the predetermined command message period is calculated using the MAC address of the second device.

10. A method as claimed in claim 8, wherein the second device, after waiting the predetermined command message period, checks if any other of the plurality of devices is sending a time-sensitive command message without the use of the token over the token ring network, and in the case that another device is sending a time-sensitive command message, the second device does not send the time-sensitive command message to the receiving device.

11. A method as claimed in claim 10, wherein the second device, in response to receiving the token, sends the time-sensitive command message to the receiving device.

12. A building management device arranged to communicate with a plurality of other devices of a building management system over a token ring network that has a token that is passed sequentially around the plurality of devices in an order, the device comprising:
    a network interface configured to interface with the token ring network;
    a controller configured to:
        receive the token of the token ring network;
        in response to receiving the token, broadcasting a request message over the token ring network concurrently to each of the plurality of devices via the network interface, the request message allowing another of the plurality of devices of the building management system to send a time-sensitive command message over the token ring network without the use of the token; and
        pass the token for the token ring network to a subsequent device on the token ring network.

13. A building management device as claimed in claim 12, wherein the controller is configured to wait a predetermined token passing period before passing the token to the subsequent device.

14. A building management device as claimed in claim 13, wherein the predetermined token passing period is between 20 ms and 30 ms.

15. A building management device as claimed in claim 12, wherein the controller is configured to pass the token to the subsequent device in response to another of the plurality of devices sending a time-sensitive command message to a receiving device over the token ring network without the use of the token.

16. A building management device as claimed in claim 12, wherein the controller is configured to broadcast the request message over the token ring network only if a predetermined request message period has passed since a request message was last broadcast over the token ring network.

17. A building management device as claimed in claim 16, wherein the predetermined request message period is 40 ms to 60 ms.

18. A building management device as claimed in claim 12, wherein the controller having the token is configured to transmit a message to another of the plurality of devices over the token ring network prior to broadcasting the request message over the token ring network.

19. A building management device as claimed in claim 12, wherein the controller, in response to receiving a broadcasted request message over the token ring network from another of the plurality of devices, is configured to send a time-sensitive command message to a receiving device without the use of the token over the token ring network.

20. A building management device arranged to communicate with a plurality of other devices of a building management system over a token ring network that has a token that is passed sequentially around the plurality of devices in an order, the device comprising:
- a network interface configured to interface with the token ring network;
- a controller configured to:
  - receive a broadcasted request message over the token ring network without the use of the token via the network interface, the broadcasted request message being sent from another device on the token ring network to allow a time-sensitive command message to be send over the token ring network also without the use of the token; and
  - in response to receiving the broadcasted request message over the token ring network, send a time-sensitive command message to a receiving device over the token ring network without the use of the token.

21. A building management device as claimed in claim 20, wherein the controller, in response to receiving the broadcasted request message over the token ring network from another of the plurality of devices, is configured to wait a predetermined command message period before sending the command message to the receiving device.

22. A building management device as claimed in claim 21, wherein the predetermined command message period is calculated using the MAC address of the device.

23. A building management device as claimed in claim 21, wherein the controller, after waiting the predetermined command message period, is configured to check if any other of the plurality of devices is sending a time-sensitive message over the token ring network without the use of the token, and in the case that another of the plurality of devices is sending a time-sensitive command message, the controller does not send the time-sensitive command message to the receiving device.

24. A building management device as claimed in claim 23, wherein the controller, in response to receiving a token, is configured to send the time-sensitive command message to the receiving device.

25. A building management system comprising:
- a token ring network having a token which is passed around the devices sequentially in an order;
- a first building management device arranged to communicate with other devices of a building management system over the token ring network, and further arranged to:
  - receive the token for the token ring network;
  - in response to receiving the token, broadcast a request message concurrently to a plurality of devices over the token ring network, the request message allowing another device of the building management system to send a time-sensitive command message without the use of the token;
  - pass the token for the token ring network to the subsequent device in the order of devices on the token ring network; and
- a second building management device, not necessarily sequentially next in the order of the token network, arranged to communicate with other devices of the building management system over the token ring network, wherein the second building management device, in response to receiving the broadcasted request message over the token ring network, sends a time-sensitive command message to a designated receiving building management device of the building management system over the token ring network without the use of the token to command the receiving device of the building management system to perform a commanded building management function.

26. A non-transitory machine readable storage medium storing a program causing a building management device to communicate with other devices of a building management system over a token ring network having a token which is passed around the devices sequentially in an order, the program causing the building management device to:
- receive a token for the token ring network;
- in response to receiving the token, broadcast a request message concurrently to each of a plurality of devices over the token ring network, the request message allowing another device of the plurality of devices to send a time-sensitive command message to a receiving device without the use of the token to command the receiving device to perform a commanded building management function; and
- pass the token for the token ring network to the subsequent device in the order of device on the token ring network.

27. A method of communication between devices of a building management system over a token ring network having a token which is passed around the devices sequentially in an order, the method comprising:
- a first device receiving the token for the token ring network;
- the first device, in response to receiving the token, broadcasting a request message over the token ring network concurrently to all the other devices in the network, the request message allowing another device of the building management system to send a time-sensitive command message without the use of the token;
- a second device, in response to receiving the broadcasted request message over the token ring network, sending a time-sensitive command message to a further receiving device over the token ring network without the use of the token, the time-sensitive command message being configured to command the further receiving device of the building management system to perform a commanded HVAC function; and
- the first device passing the token for the token ring network to the sequentially-next device in the order of the token ring network.

* * * * *